United States Patent [19]

Johnson et al.

[11] Patent Number: 4,671,479
[45] Date of Patent: Jun. 9, 1987

[54] ADJUSTABLE SUPPORT APPARATUS

[75] Inventors: Jeffrey M. Johnson; Jon L. Lindskog; Darrell A. Schoenig, all of Fort Collins, Colo.

[73] Assignee: Ultimate Support Systems, Inc., Fort Collins, Colo.

[21] Appl. No.: 857,932

[22] Filed: Apr. 30, 1986

[51] Int. Cl.⁴ .............................................. F16M 11/38
[52] U.S. Cl. ...................................... 248/173; 403/91; 248/188.5; 248/188.7
[58] Field of Search ................... 248/173, 188.5, 188.2, 248/188.7, 176, 161, 125, 412, 157, 167, 168, 170; 403/91, 92; 211/100, 101, 172

[56] References Cited

U.S. PATENT DOCUMENTS

| | | | |
|---|---|---|---|
| 230,851 | 8/1880 | Anthony | 211/100 X |
| 2,109,032 | 2/1938 | Pleiss | 211/100 |
| 2,727,708 | 12/1955 | Lorenzen | 248/173 X |
| 3,804,355 | 4/1974 | Uroshevich | 248/125 |
| 3,881,675 | 5/1975 | Matchett | 248/170 |
| 4,074,881 | 2/1978 | Bickford | 248/188.7 |
| 4,365,535 | 12/1982 | Buttner et al. | 248/412 X |
| 4,596,484 | 6/1986 | Nakatani | 248/188.5 X |

Primary Examiner—Ramon O. Ramirez
Attorney, Agent, or Firm—Dean P. Edmundson

[57] ABSTRACT

Portable, collapsible, adjustable support apparatus is described comprising first and second tubular members which are telescopically connected. A base member including pivoting legs is preferably attached to the lower end of the first tubular member. The second tubular member includes engagement means which is adapted to releasably engage the interior surface of the first tubular member. Release means carried by the second tubular member may be actuated by one hand to raise or lower the second tubular member with respect to the first tubular member. A locking system is also described which is adapted to releasably lock pivotable leg members to a base member. The leg members may be locked in either an upward or downward position.

19 Claims, 10 Drawing Figures

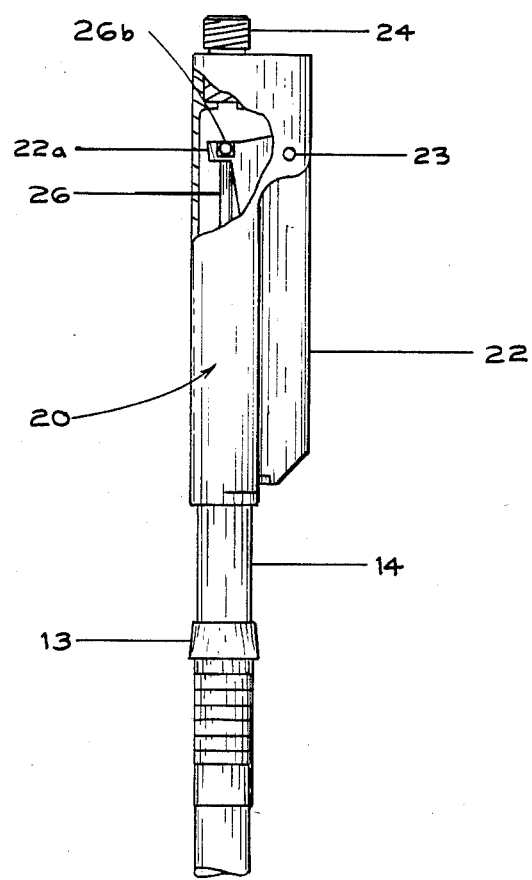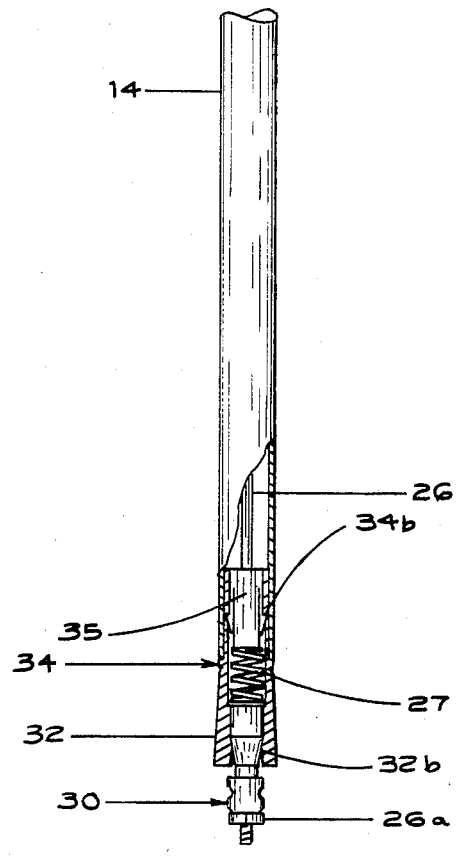
FIG. 5

4,671,479

ADJUSTABLE SUPPORT APPARATUS

FIELD OF THE INVENTION

This invention relates to support apparatus. More particularly, this invention relates to adjustable support apparatus which is useful, for example, for supporting items such as microphones, speakers, lights, and the like.

BACKGROUND OF THE INVENTION

Conventional microphone stands which are vertically adjustable typically utilize a collar which is threadably secured to the upper portion of one of the telescoping sections. In order to adjust the height of such stands it is necessary to use both hands to loosen the collar, raise or lower the upper section, and then secure the collar again by rotating it relative to the stand until it is tightened.

There are several disadvantages associated with such conventional apparatus. Since two hands are required to adjust the height, a person must bend over at least somewhat in order to accomplish this. However, as a result it is difficult to determine the proper vertical adjustment relative to the normal standing height of the person doing the adjusting. Consequently, it is sometimes necessary to adjust the height of the stand a number of times to obtain the desired height.

Furthermore, when the microphone (or other device secured to the top of the apparatus) is rotated relative to the stand, the threaded collar may be turned loose to an extent that the upper portion of the stand may slip downwardly. Then it is necessary to re-set the stand to the desired height and again tighten the collar.

Other disadvantages associated with conventional microphone stands and the like concern the bases on which such stands are supported. For example, one common style of a base previously used is a solid, heavy metal base (usually made of cast iron). Such bases are bulky and cumbersome. Consequently, they are not easy to carry or transport. Another common style of a base which has been used is a steel tripod whose legs fold or collapse downwardly. The tripod is releasably secured to the stand (for example, with a wing nut which may be loosened, thereby allowing the folded tripod base to slide upwardly along the stand). Thus, the tripod base is a separate unit which must be securely fastened to the stand in order to support the stand in a stable manner.

Another type of telescoping microphone stand which has been available utilizes a tilting disk at the bottom of the vertically adjustable section of the stand. The tilting disk is designed to prevent the adjustable section from being pulled downwardly by gravity but it does not restrict upward movement of such section. A movable knob at the upper end of the stand is designed to tilt and release the disk to allow downward movement of the adjustable section. Thus, such stand does not involve a positive lock of the vertically adjustable section to the stationary section.

SUMMARY OF THE PRESENT INVENTION

In accordance with the present invention there is provided adjustable support apparatus which is very useful for a variety of purposes. For example, the support apparatus is especially useful for supporting a microphone, speaker, lights, camera equipment, telescopes, sheet music, tables, microphone booms, and the like.

In one embodiment there is provided portable, collapsible, vertically adjustable support apparatus comprising:
  (a) a first elongated tubular member having upper and lower ends;
  (b) a base member secured to the lower end of the first tubular member;
  (c) a second elongated tubular member slidably received within the upper end of the first tubular member;
  (d) engagement means carried by the second tubular member; the engagement means being adapted to releasably engage the interior surface of the first tubular member;
  (e) release means carried by the second tubular member;
  (f) elongated connection means which is connected between the engagement means and the release means;
  (g) a plurality of leg members pivotably attached to the base member;
  (h) locking means carried by the base member which is movable between first and second positions; wherein the locking means is adapted to lock the leg members in an outward position when the locking means is in its first position and is adapted to unlock the leg members when it is in the second position.

The second tubular member is adapted to move longitudinally within the first tubular member when the release means is actuated to disengage the engagement means from the interior surface of the first tubular member.

The release means is preferably designed such that only one hand is required to actuate it. This feature is especially desirable, for example, when the apparatus is used to support a microphone.

In another embodiment there is provided a unique folding or collapsible base which is useful as a support for conventional upright stands, for example, of the type used for supporting microphones, speakers, lights, sheet music, tables, musical instrument stands, display stands, etc. The leg members of the folding base may be easily and quickly folded from an upward position to a downward position. The leg members may then be locked in either position, as desired. In a preferred embodiment the base member also includes a retractable clip or retention means (e.g., to secure an electric cord to the base). The base member is firmly secured to any desired upright stand, and it is not necessary to move the base member with respect to the stand in order to collapse the base.

BRIEF DESCRIPTION OF THE DRAWINGS

The invention is described in more detail hereinafter with reference to the accompanying drawings, wherein like reference characters refer to the same parts throughout the several views and in which:

FIG. 5 is an elevational, partial cut-away view of one embodiment of engagement means used in the present invention;

DETAILED DESCRIPTION OF THE INVENTION

Figure 1:
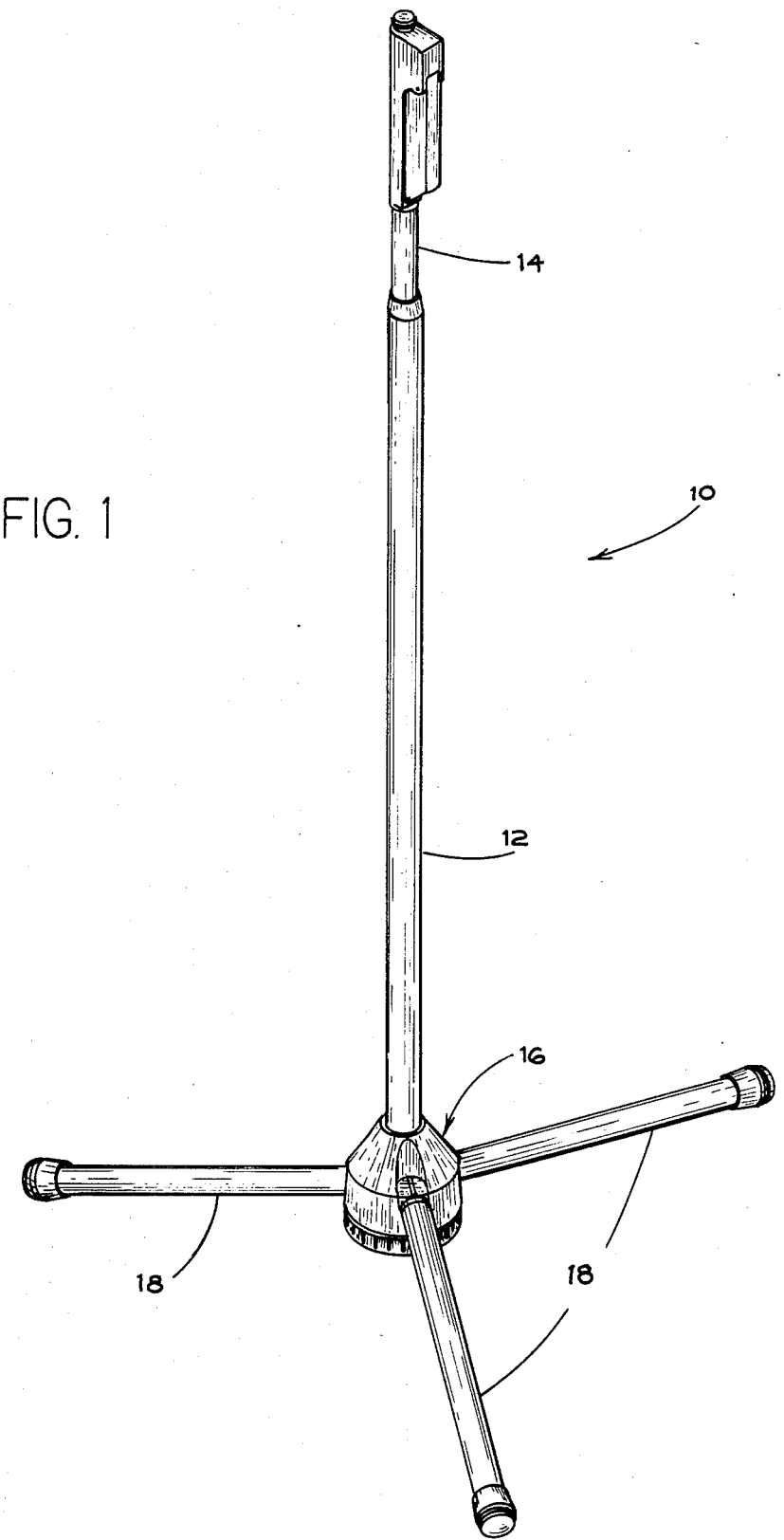
FIG. 1 is a perspective view of one embodiment of adjustable support apparatus of the invention.
Figure 2:
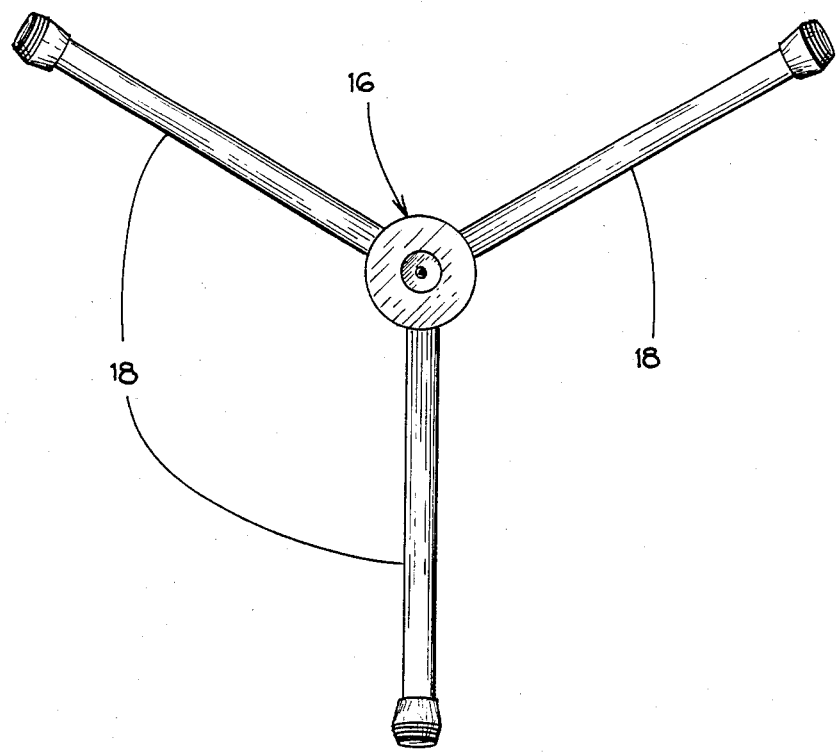
FIG. 2 is a bottom view of the apparatus of FIG. 1.

In FIG. 1 there is shown a perspective view of a preferred embodiment of adjustable support apparatus 10 of the invention. In FIG. 2 there is shown a bottom view of the apparatus of FIG. 1.

Apparatus 10 comprises a first elongated tubular member 12 having upper and lower ends, and a second elongated tubular member 14 slidably received within the upper end of tubular member 12. A base member 16 is secured to the lower end of the tubular member 12. A plurality of leg members 18 are pivotably attached to base member 16. Preferably there are three such leg members attached to base 16, and preferably they are equidistantly spaced around the base, as shown. If desired, there may be additional leg members pivotably attached to the base.

Figure 3:
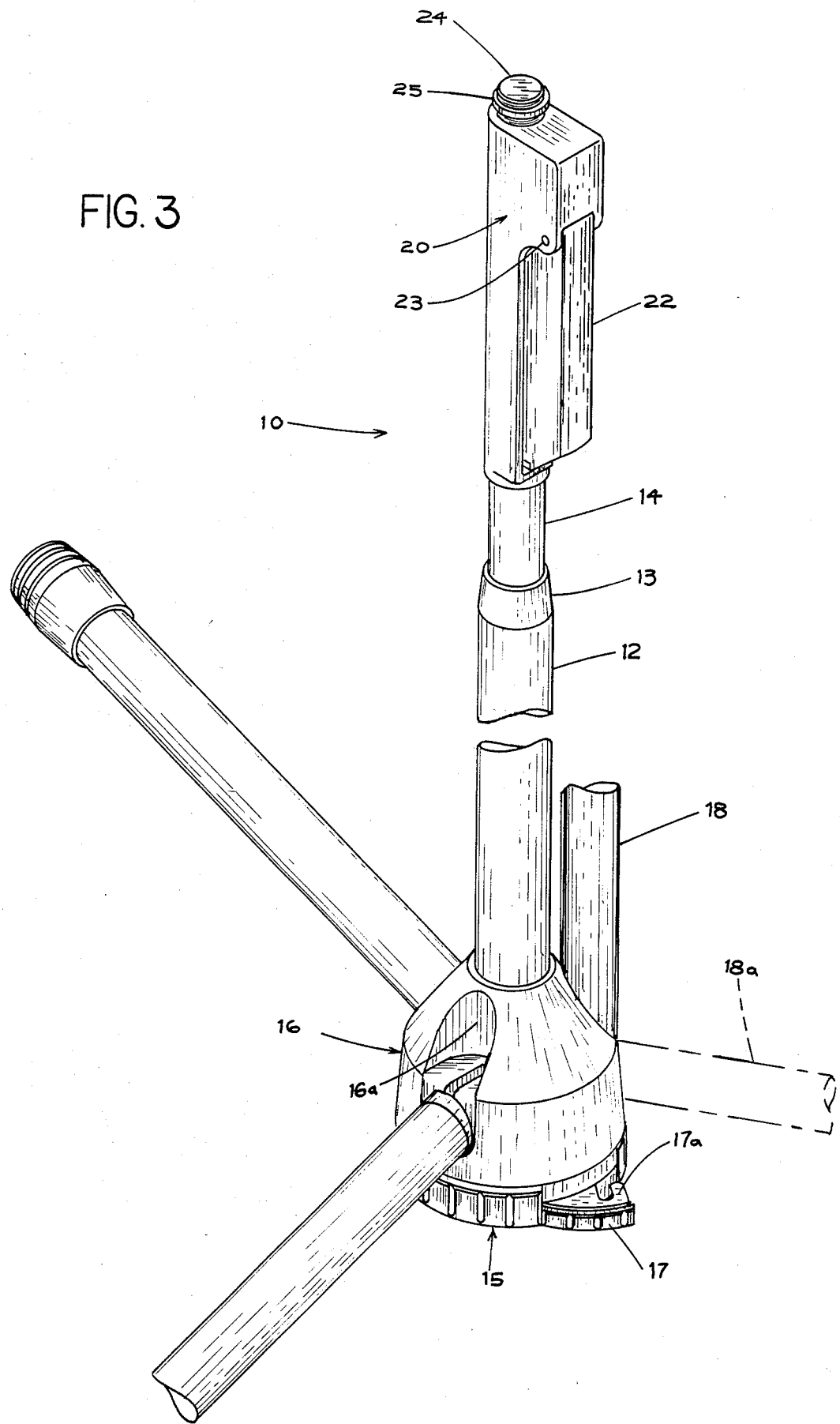
FIG. 3 is a perspective view illustrating various features of one embodiment of the invention.
Figure 4:
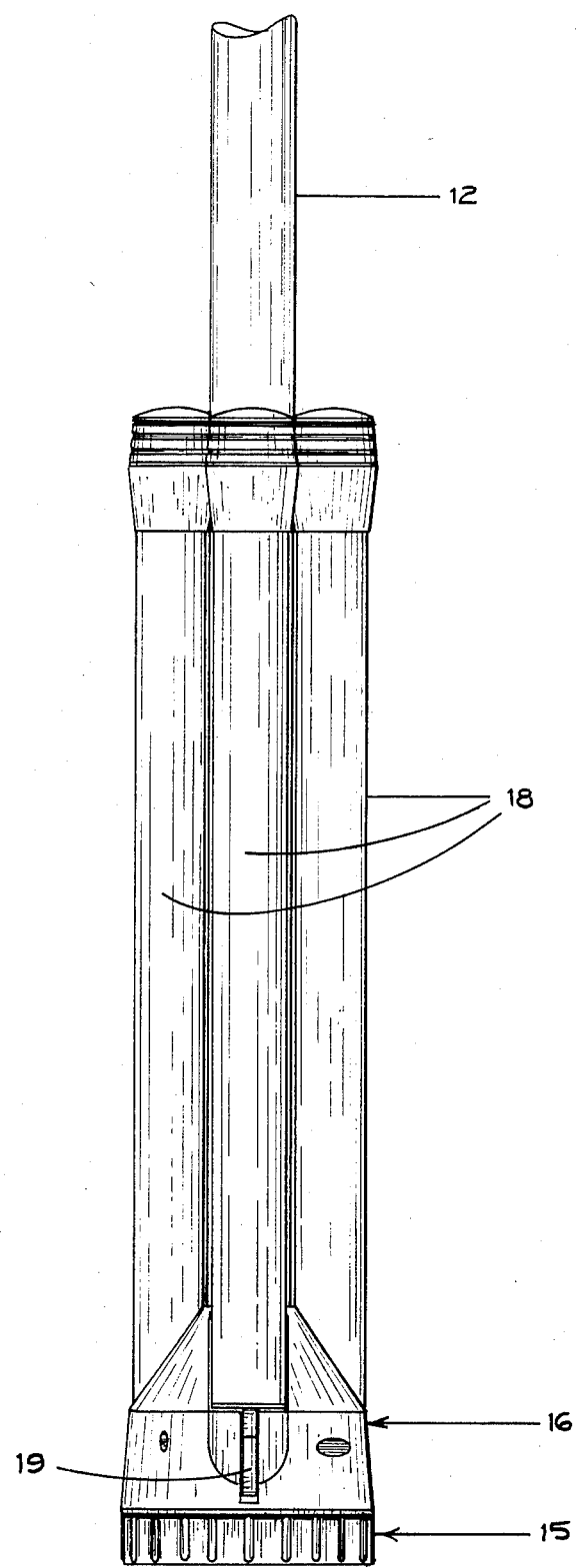
FIG. 4 shows the base portion of the apparatus of FIG. 1 when the legs are pivoted to their upward position.

FIGS. 3 and 4 further illustrate the embodiment of apparatus shown in FIGS. 1 and 2. Thus, leg members 18 are adapted to fold or pivot upwardly to a position where they are parallel to tubular member 12. In FIG. 4 all three leg members are shown in their upward position (e.g., for storage or transport of the apparatus). The inner end 19 of each leg member 18 is in the form of a blade, as shown, which is pivotably attached to the base 16. In FIG. 3 two of the legs are in their lowered position while one is in its upward position (and its lowered position is indicated with dotted lines 18a). Reliefs or cavities 16a in base member 16 enable each leg 18 to be folded or pivoted upwardly, as illustrated.

FIG. 3 also shows cord retention member 17 which is pivotably attached to base 16. Retention member 17 includes a clip or hook 17a in which an electric cord leading to a microphone, speaker, light, etc. mounted at the top of the apparatus may be retained. This prevents the cord from becoming tangled or inadvertently being snagged. Preferably cord retention member 17 is retractable and is normally biased to an inward position (for example, by means of a spring).

The tubular member 14 is slidably received within tubular member 12. Collet 13 at the top of member 12 may be made of plastic, for example, and is sized such that its inner diameter is only slightly larger than the outer diameter of member 14.

At the upper end of tubular member 14 is head member 20 which includes attachment means 24. In this embodiment the attachment means 24 is a threaded shank. Nut 25 threadably engages the shank 24. This provides a means of attaching or mounting a desired object to the top of the head member, e.g., a microphone, speaker, light, camera, telescope, etc. The power cord leading to such object may then extend downwardly along the apparatus to the retention member 17.

Head member 20 also includes lever 22 which is hinged at one end to head 20 by pin 23. Lever 22 is adapted to release the engagement of the tubular member 14 within tubular member 12, as explained in detail hereafter.

The lower portion 15 of base member 16 is rotatable relative to base 16 between first and second positions. In its first position it is adapted to lock the leg members 18 in their outward (i.e., downward) position. In its second position it is adapted to unlock the leg members 18 and allow the leg members to be pivoted upwardly. Then portion 15 may be rotated to its first position again to lock the leg members in their upward position.

FIG. 5 is a partial cut-away view of tubular member 14 which illustrates the engagement means and the means for releasing the engagement means so that tubular member 14 may be moved vertically relative to tubular member 12. The engagement means is preferably located at the lower end of member 14 and is adapted to releasably engage the interior surface of tubular member 12.

The preferred engagement means comprises a plurality of wing members 32 surrounding an elongated wedge member 30 which is movable between first and second positions. When the wedge member 30 is in its second (i.e., outward) position, the wing members 32 are urged against the interior surface of tubular member 12. When the wedge member 30 is in its first (i.e., inward) position, the wing members 32 are allowed to collapse or move towards each other slightly in a manner such that they do not engage the interior surface of the tubular member 12. This enables tubular member 14 to move vertically relative to member 12.

Wedge member 30 is normally biased to its second or outward position by spring 27 so that normally tubular member 14 is fixed relative to tubular member 12.

Figure 6:
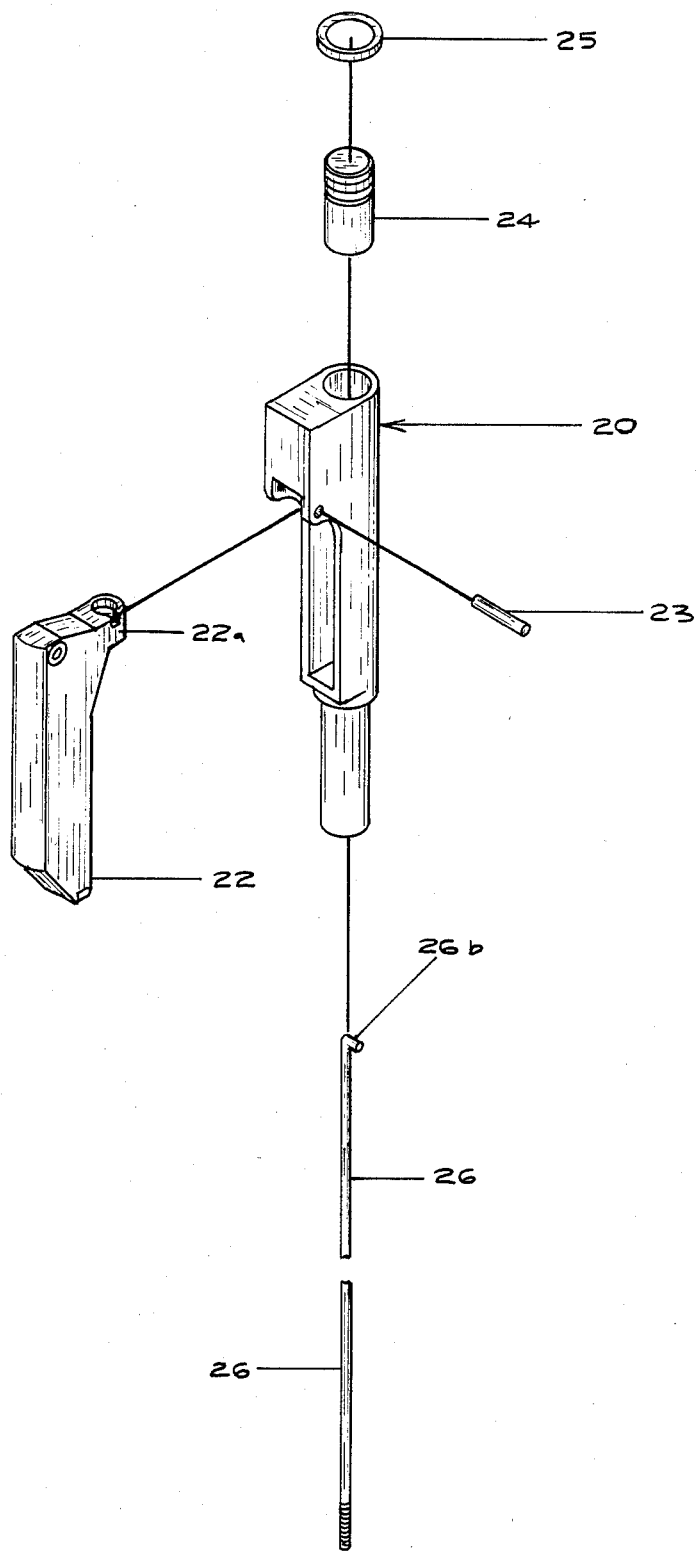
FIG. 6 is an explosion view illustrating the components in a preferred release means arrangement which is useful in the present invention.

Connection means 26 extends through tubular member 14 from lever 22 to wedge member 30. Preferably the connection means comprises an elongated rod, although it may instead be a cable if desired. The lower end of rod 26 is threaded so that a nut 26a may be fastened thereto to hold the wedge member 30 onto rod 26. The upper end 26b of rod 26 is adapted to be connected to the rear 22a of lever arm 22. For example, the upper end of rod 26 may include a hook 26b which is adapted to rest within and be captured by a slot in the rear of lever arm 22. This is further illustrated in FIG. 6.

Figure 7:
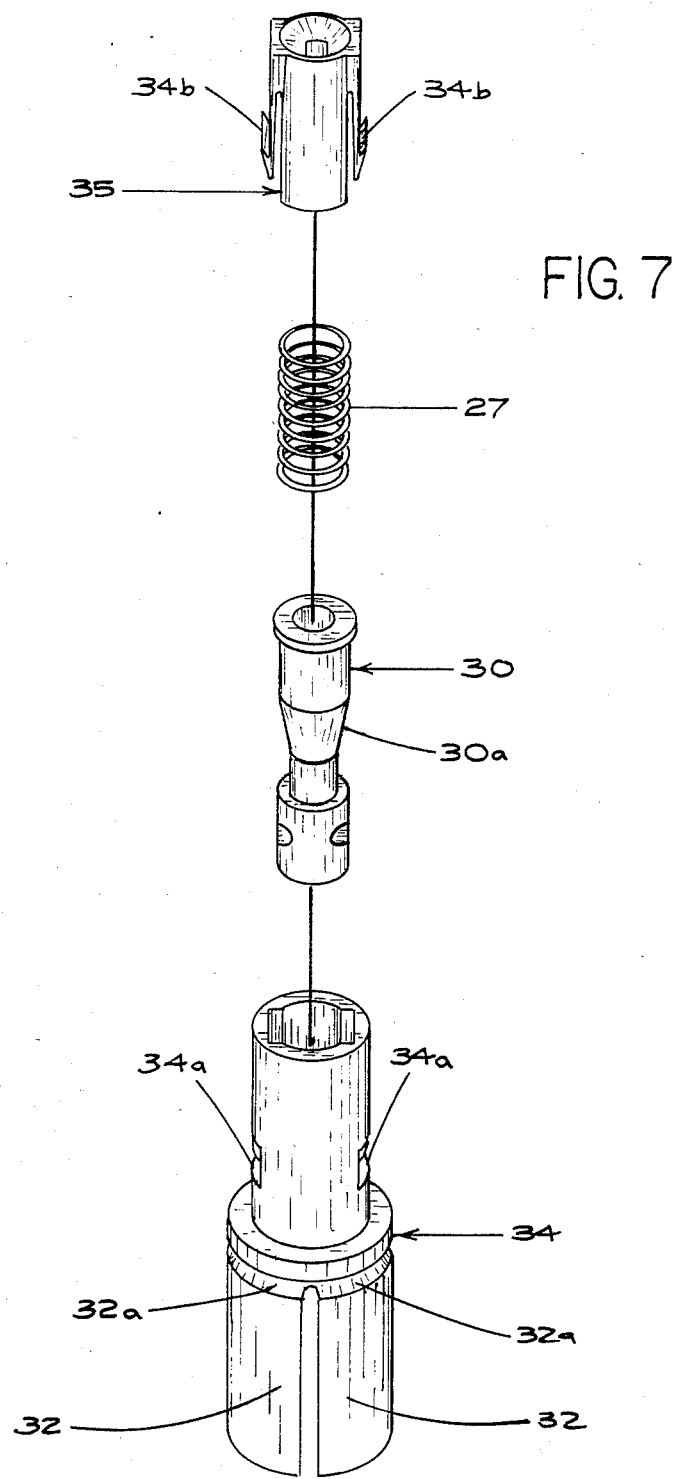
FIG. 7 is an explosion view illustrating one embodiment of engagement means useful in the present invention.

The preferred engagement means is further illustrated in FIG. 7. The engagement means includes a housing or body 34 having a longitudinal opening therethrough which is adapted to receive the elongated wedge member 30, spring 27, and retainer 35.

The lower portion of body 34 includes wing members 32 (e.g., at least two wing members, and preferably about four wing members). The upper ends 32a of the wing members are sufficiently thin that the wing members can pivot or flex slightly with respect to body 34 when wedge member 30 moves vertically within body 34.

Preferably body 34, including wing members 32, is unitary and is made of plastic (e.g., polyurethane). For example, body 34 may be injection molded in accordance with conventional techniques. Apertures 34a in body 34 are adapted to engage and retain hooks 34b of retention member 35 when assembled as shown in FIG. 5.

Most preferably the exterior surface of each wing member 32 comprises a layer of pliable and resilient rubber (i.e., soft polyurethane, silicone rubber, or other known pliable and resilient materials) which has a Shore A hardness not greater than about 100 so that the exterior surface of the wing members will easily engage the interior surface of the tubular member 12. Although it is preferred for the surface of the wing members to be smooth, such surface may include a tread design if desired. The pliable rubber layer may be secured to the wing member by means of adhesive, mechanical fasteners, etc. or it may be molded and bonded directly to the wing member.

Each wing member 32 preferably includes an inclined or sloped interior surface 32b (as illustrated in FIG. 5). Wedge member 30 also includes a sloped surface 30a (FIG. 7) which is adapted to engage interior surface 32b of each wing member 32. Thus, when wedge member 30 moves downwardly with respect to body 34, sloped surface 30a pushes against sloped surface 32b and accordingly urges wing members 32 outwardly. In this manner wing members 32 are pressed against, and thereby engage, the interior surface of tubular member 12.

When wedge member 30 is moved upwardly (via connection rod 26 and lever 22), surface 30a moves away from each surface 32b of wings 32. As a result there is no force urging wings 32 against tubular member 12, and tubular member 14 is thereby able to move vertically with respect to tubular member 12.

Figure 8:
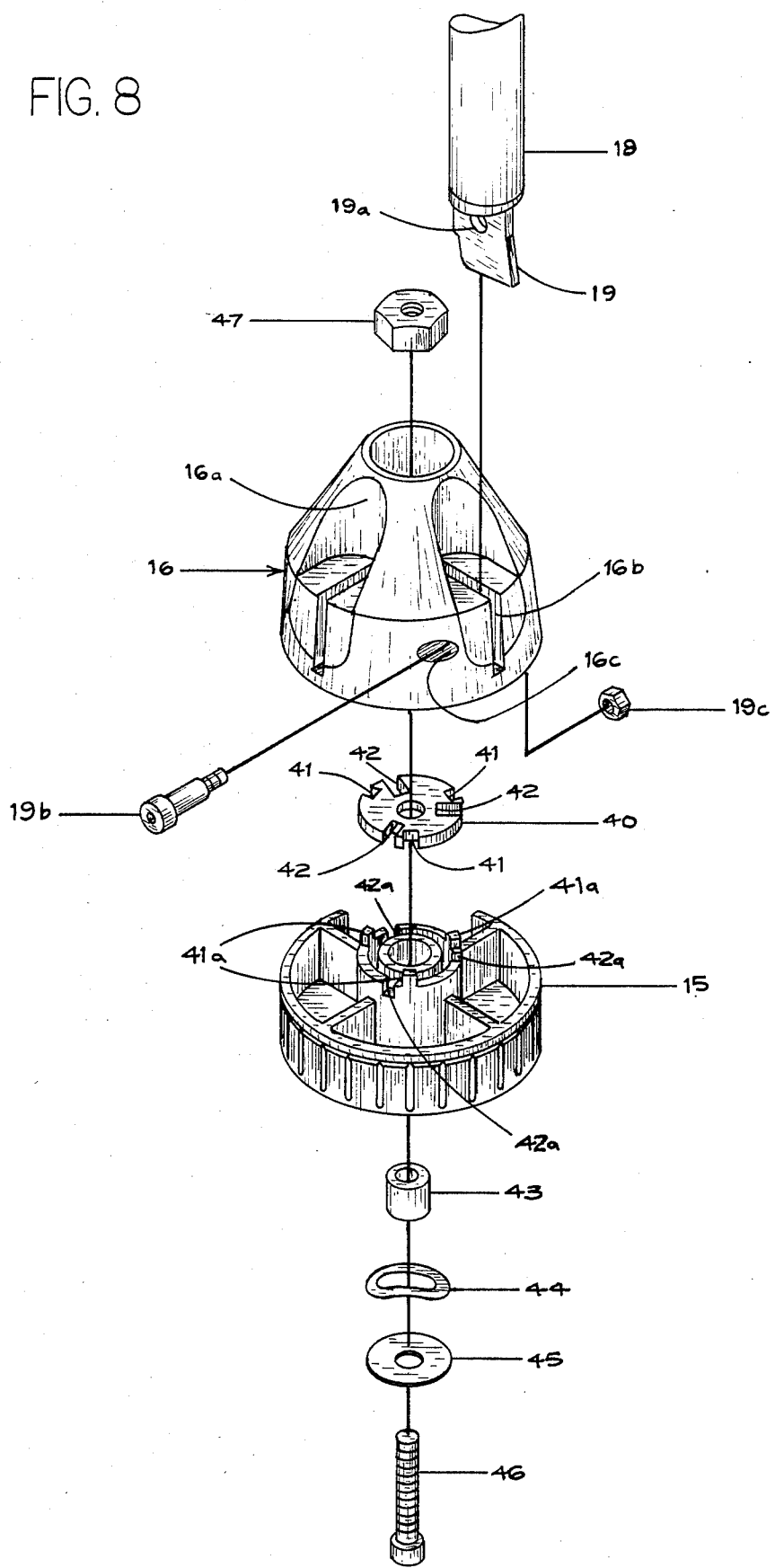
FIG. 8 is an explosion view illustrating a preferred embodiment of base member useful in the present invention.

In FIG. 8 there is shown an explosion view of the base member and its components. Base housing 16 is preferably made of plastic (e.g., polycarbonate, nylon, or other such plastic, or aluminum, or steel, etc.) which is lightweight, durable, and easily molded by conventional techniques if it is made of plastic. Base 16 includes reliefs or cavities 16a to allow each leg member 18 to pivot or fold upwardly to a position parallel to tubular member 12.

The inner end of each leg 18 preferably includes a blade or bar 19 having aperture 19a therethrough. Blade 19 is adapted to fit within a slot 16b in base 16, and bolt 19b is adapted to extend through opening 16c in base 16 and aperture 19a in blade 19 to pivotably secure leg 18 to base 16. Nut 19c threadably engages bolt 19b within base 16 and retains the bolt in place.

Locking ring 40 is adapted to be engaged by cap member 15 in a manner such that ring 40 and cap 15 are rotatable as a unit between first and second positions. Small slots 41 around the periphery of the ring 40 are adapted to be engaged by tabs 41a on cap 15 when the unit is assembled. Larger slots 42 around the periphery of the ring 40 correspond with the spacing of grooves 42a in cap 15 and slots 16b in base 16. Bolt 46 extends vertically through washers 45 and 44, bushing 43 and central openings in cap 15, ring 40, and base 16. Nut 47 threadably engages bolt 46 to hold the assembly together.

Figure 10:
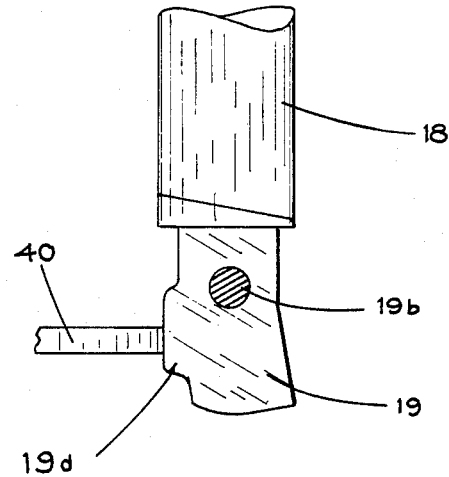
FIG. 10 illustrates one manner in which the locking means secures leg members in their upward position.

When cap 15 is rotated to a position where slots 42 in ring 40 are aligned with slots 16b in base 16, then blade 19 of leg 18 is able to be pivoted through ring 40 as leg 18 is pivoted upwardly. When the legs 18 are each in their downward position blade 19 is above ring 40. Then when cap 15 (and hence ring 40) are rotated to a second position, blade 19 is prevented from pivoting through ring 40. In this manner the legs 18 are locked in downward position. FIG. 10 illustrates one manner in which each leg member 18 may be locked in its upward position by locking ring 40. Thus, after each leg 18 has been pivoted to its upward position, as illustrated, locking ring 40 is rotated again to its first position whereby the rear edge 19d of blade 19 abuts against locking ring 40. This prevents each leg 18 from being pivoted to its downward position.

Figure 9:
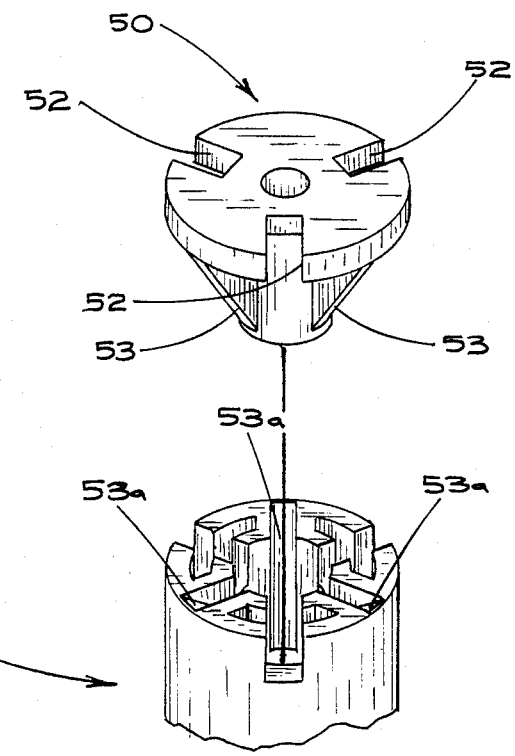
FIG. 9 illustrates a second embodiment of locking means which is useful in the present invention.

FIG. 9 illustrates an alternative embodiment of locking ring 50 having slotted apertures 52 spaced about its periphery. Gussets or ribs 53 serve to provide rigidity and strength to the locking ring. Gussets 53 are also adapted to be engaged by complementary grooves or slots 53a in the upper portion of cap 60. After assembly, the locking ring 50 and cap 60 are rotatable as a unit.

The locking ring 40 shown in FIG. 8 is made of metal. The locking ring 50 shown in FIG. 9 is also made of metal, but in light duty applications it could be made of plastic or of a combination of metal and plastic parts.

Other variants are also permissible within the scope of the present invention. For example, the adjustable support apparatus may be used as a means for telescoping items such as microphone booms (whether they be disposed horizontally or vertically), or lightweight tripods where telescoping legs are desirable, or in monopods where only one support leg is used (e.g., for cameras or the like). The tubular members may be made of metal (e.g., aluminum or steel) or other materials having the desired structural integrity.

What is claimed is:

1. Portable, collapsible, vertically adjustable support apparatus comprising:
   (a) a first elongated tubular member having upper and lower ends;
   (b) a base member secured to said lower end of said first tubular member;
   (c) a second elongated tubular member slidably received within said upper end of said first tubular member;
   (d) engagement means carried by said second tubular member; said engagement means being adapted to releasably engage the interior surface of said first tubular member;
   (e) release means carried by said second tubular member;
   (f) elongated connection means which is connected between said engagement means and said release means;
   (g) a plurality of leg members pivotably attached to said base member;
   (h) locking means carried by said base member which is movable between first and second positions; wherein said locking means is adapted to lock said leg members in an outward position when said locking means is in said first position and is adapted to unlock said leg members when in said second position;
   wherein said second tubular member is adapted to move longitudinally within said first tubular member when said release means is actuated to disengage said engagement means from said interior surface of said first tubular member.

2. Support apparatus in accordance with claim 1, wherein said engagement means comprises:
   (a) a plurality of wing members, and
   (b) an elongated wedge member which is movable between first and second positions, wherein said wedge member is biased to said second position in a manner such that said wedge member urges said wing members against said interior surface of said first tubular member;

wherein said elongated connection means is connected between said wedge member and said release means.

3. Support apparatus in accordance with claim 2, wherein said wedge member is biased to said second position by means of a spring.

4. Support apparatus in accordance with claim 2, wherein the portions of said wing members which are adapted to releasably engage said interior surface of said first tubular member comprise a pliable rubber having a Shore A hardness not exceeding about 100.

5. Support apparatus in accordance with claim 1, wherein said release means comprises a lever which is pivotably mounted to the top portion of said second tubular member.

6. Support apparatus in accordance with claim 1, wherein said leg members have inner and outer ends, and wherein each said leg member is pivotably attached to said base member near its said inner end.

7. Support apparatus in accordance with claim 6, wherein said locking means comprises a plate member having a plurality of slots therethrough, said plate member being rotatable between first and second positions, wherein when said plate member is in said first position said inner ends of said leg members are adapted to pass through said slots said plate member when said leg members are pivoted with respect to said base member, and when said plate member is rotated to its said second position said inner ends of said leg members are captured in said base member.

8. Support apparatus in accordance with claim 1, wherein said base member further includes retractable retention means.

9. Portable, adjustable support apparatus comprising:
(a) a first elongated tubular member having upper and lower ends;
(b) support means secured to said lower end of said first tubular member;
(c) a second elongated tubular member slidably received within said upper end of said first tubular member;
(d) engagement means carried by said second tubular member; said engagement means being adapted to releasably engage the interior surface of said first tubular member; wherein said engagement means comprises a plurality of wing members and an elongated wedge member which is movable between first and second positions; wherein the portions of said wing members which are adapted to releasably engage said interior surface of said first tubular member comprise a pliable rubber having a Shore A hardness not exceeding about 100; wherein said wedge member is biased to said second position in a manner such that said wing members are urged against said interior surface of said first tubular member;
(e) release means carried by said second tubular member;
(f) elongated connection means which is connected between said wedge member and said release means;

wherein said second tubular member is adapted to move longitudinally within said first tubular member when said release means is actuated to move said wedge member from said second position to said first position.

10. Apparatus in accordance with claim 9, wherein said release means comprises a lever which is pivotably mounted to the top portion of second tubular member.

11. Apparatus in accordance with claim 9, wherein said wedge member is biased to said second position by means of a spring.

12. Apparatus in accordance with claim 9, wherein said first and second tubular members comprise aluminum.

13. A locking system in combination with a base member having a plurality of legs pivotably attached thereto, said locking system adapted to releasably lock said pivotable leg members to said base member, wherein said leg members have inner and outer ends, and wherein each said leg member is pivotably attached to said base member at a point near said inner end, wherein said locking system comprises a plate member rotatably attached to said base member, said plate member including a plurality of slots therethrough, and said plate member being rotatable between first and second positions, wherein when said plate member is in said first position means are provided to permit said inner ends of said leg members to pass through said slots in said plate member when said leg members are pivoted with respect to said base member, and when said plate member is rotated to its said second position addition means cause said inner ends of said leg members to be captured in said base member.

14. A locking system in accordance with claim 13, wherein said plate member comprises metal.

15. A locking system in accordance with claim 13, wherein said inner end of each said leg member includes a blade.

16. A locking system in accordance with claim 13, wherein said plate member is adapted to lock said leg members in an upward position with respect to said base member and is also adapted to lock said leg members in a downward position with respect to said base member.

17. A locking system in accordance with claim 13, wherein said base member further includes retractable retention means.

18. A locking system in accordance with claim 17, wherein said retention means comprises a hook member which is pivotably attached to said base member.

19. A locking system in accordance with claim 17, wherein said retention means is biased toward a retracted position by means of a spring.

* * * * *